United States Patent
Huang (10) Patent No.: US 6,895,642 B2
(45) Date of Patent: May 24, 2005

(54) MULTI-FUNCTION HANGING AND FASTENING DEVICE

(76) Inventor: Yea Yen Huang, No. 12, Alley 70, Sec. 1, Chung Hua Road, Tocheng City, Taipei Hsien (TW)

(*) Notice: Subject to any disclaimer, the term of this patent is extended or adjusted under 35 U.S.C. 154(b) by 0 days.

(21) Appl. No.: 10/658,329

(22) Filed: Sep. 10, 2003

(65) Prior Publication Data

US 2005/0044673 A1   Mar. 3, 2005

(51) Int. Cl.$^7$ .......................... F16B 47/00; A44B 21/00
(52) U.S. Cl. .................. 24/303; 248/205.5; 248/206.5; 248/309.3; 248/309.4; 248/363
(58) Field of Search .......................... 24/303; 248/683, 248/206.2, 206.5, 205.5, 205.7, 309.3, 309.4, 248/363

(56) References Cited

U.S. PATENT DOCUMENTS

| | | | |
|---|---|---|---|
| 4,848,713 A | * | 7/1989 | Adams ..................... 248/206.2 |
| 5,029,786 A | * | 7/1991 | Wu .......................... 248/205.7 |
| 5,613,659 A | * | 3/1997 | Hong ....................... 248/205.5 |
| 5,630,517 A | * | 5/1997 | Maznik .................... 248/309.4 |
| 6,425,560 B1 | * | 7/2002 | Dembowiak et al. ..... 248/206.5 |
| 6,564,434 B1 | * | 5/2003 | Morita ........................ 24/303 |
| 6,666,420 B1 | * | 12/2003 | Carnevali ................ 248/205.8 |

* cited by examiner

Primary Examiner—Robert J. Sandy
(74) Attorney, Agent, or Firm—Troxell Law Office, PLLC (57) ABSTRACT

A multiple-function hanging and fastening device has multiple functions of an attracting magnet, a sucking sucker and a tightening screw, characterized in that, at least one side of the device has a magnet and a rubber sucker, for selective sucking on to a computer, electrical appliance, decorated wall surface, a metal panel of a car or a piece of furniture, a glass panel or a smooth plate, and selectively, a magnet and a rubber sucker are installed on a same side to increase its suction performance, and the outside or structural body of the casing is provided with a screw hole permitting the insertion of a screw to fasten onto an ordinary wall surface, and, one of accessories, including a hanging hook, a Velcro band, a wire bundling band and a multiple-function gripping palm figure, can be combined onto the main unit to extend its range of applications, obviously, its structure and applications have multiple functions and convenience.

11 Claims, 8 Drawing Sheets

MULTI-FUNCTION HANGING AND FASTENING DEVICE

FIELD OF THE INVENTION

A structural design of a hanging device that can be attached to a computer, electrical appliance, decorated wall surface, metal panel of a car or piece of furniture, glass or smooth plate or screwed to an ordinary wall, its main unit is capable of containing a hanging hook, Velcro band, wire bundling band, a gripping palm figure, and such accessories, for the purpose of hanging objects, fastening particular articles, sorting out computer cable, or fixing a pipe, to extend its applications, functions and convenience.

DESCRIPTION OF THE PRIOR ART

Generally, a hanging hook or a sucker is used to suck onto a smooth surface such as a glass, or a magnetic tab is used to attach onto a metal panel, or a wire clip or positioning bolt is fastened on a wall to fasten a wire or pipe, in the use of computer, installation of network circuits, installation of telephone, attachment of data on a metal plate, marking on a metal plate, exhibition of products, public notices, signboards, or fixing of pipes or other applications, such as key rings, hair dryers, sunshade curtains on windows, etc. where frequent relocation of devices is required.

The above devices are selectively used for purposes including sorting of computer cords, network cables or telephone cords, hanging hooks are attached on ceramic tiles to hang articles, data slips are attached onto metal surfaces, such as whiteboard or refrigerator surface, or for labeling or marking purposes, fasteners are tightened on boards before plastic, metal or glass bulletin boards are installed to serve as temporary notices.

As described above, different suckers, magnets or fasteners must be purchased for different purposes for use in different conditions. Therefore, to meet user's different requirements, the producer has to increase production costs. The users will purchase different products to suit different circumstances. Both producers and users will not like the resulting increase of costs.

Therefore, the inventor has tried to combine the above appliances into one unit, so as to increase its functions and range of applications. The present invention of multiple-function hanging and fastening device relates to a structure with at least one of two sides having a magnet and a rubber sucker, which are selected to suck onto a computer, electrical appliance, decorated wall surface, a metal plate of a car or a piece of furniture, a glass panel or a smooth plate, and on the outside of a casing is provided with a screw hole for screwing onto an ordinary wall, and the main unit can be attached by a hanging hook, a Velcro band, a wire bundling band, or a gripping palm figure or other accessories, or directly connected with related structures, such as key rings, etc., providing hanging purposes for key rings, wire clips, computer peripherals, car appliances, kitchen ware, bathroom utensils, hand-held cell phones, tea cups, mirrors, public notices, signboards, etc.

SUMMARY OF THE INVENTION

It is an objective of the present invention to provide a multiple-function hanging and fastening device that is capable of magnetic attraction, disc suction and screw tightening functions simultaneously, characterized in that, on two sides or one side of the device is installed a magnet and a rubber sucker for selectively sucking onto a computer set, an electrical appliance, a decorated wall, a metal panel or glass panel or a smooth panel of a car or a piece of furniture. On the same side of the device is installed simultaneously a magnet and a rubber sucker to enhance its sucking and attaching performance. The main unit is capable of combining a hanging hook, a Velcro band, a wire bundling band or a multiple-function palm figure accessory for gripping purposes, to enhance its performance and convenience.

Figure 1:
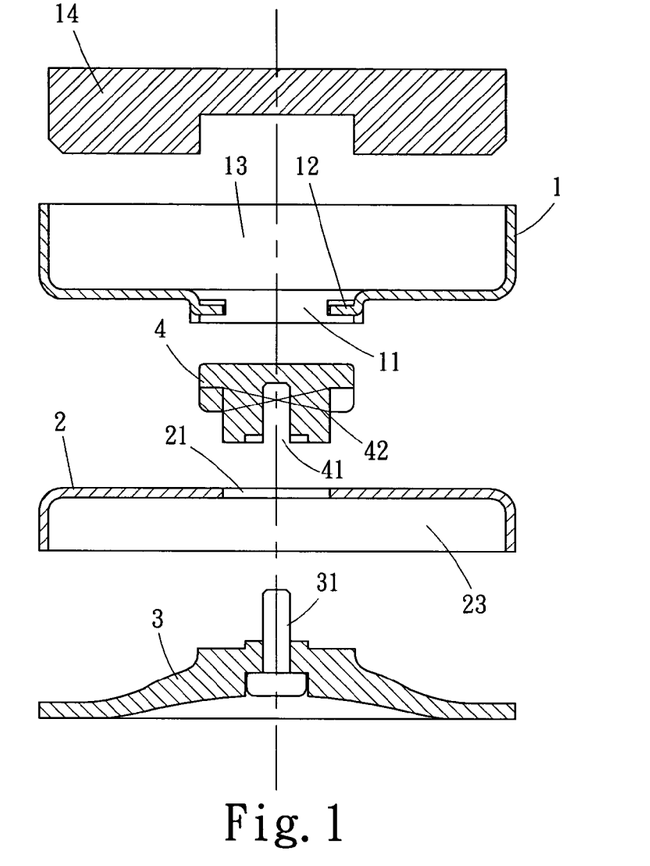
FIG. 1 is a section view of disassembled components of the present invention.
Figure 2:
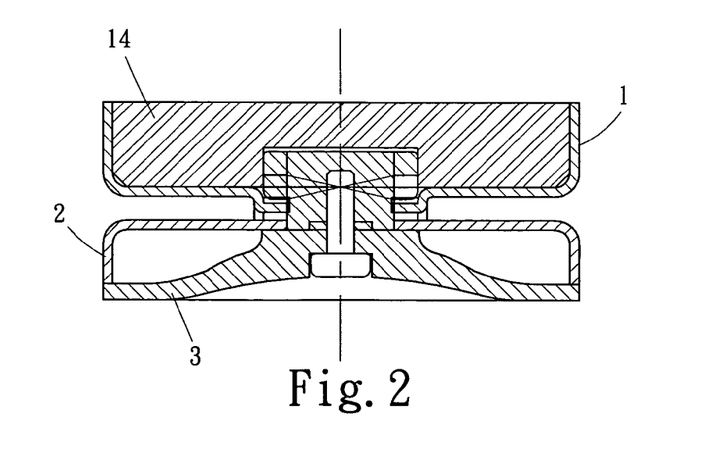
FIG. 2 is a section view of assembled components of the invention.

As shown in FIGS. 1 and 2, the present invention of multiple-function hanging and fastening device comprises a set of separable upper casing (1) and a lower casing (2), the upper casing (1) shaped like a disc, having a through hole (11) at a center thereof. On the inside of the through hole (11) is a protruded block (12) extending to its center. The upper casing (1) forms a depressed groove (13) to accommodate the installation of a magnet (14). The lower casing (2) is also shaped like a disc, but in a direction opposite to that of the upper casing (1), having also a through hole (21) at its center. The lower casing (2) has a depressed groove (23) serving to accommodate a rubber sucker set.

Figure 3:
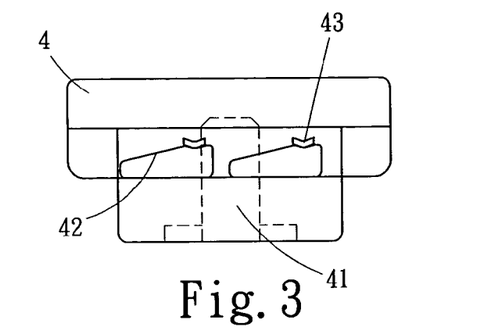
FIG. 3 is a side view of the brake block of the invention.

The rubber sucker set comprises a rubber sucker (3) and a brake block (4). The rubber sucker (3) has a screw bolt (31), one end extending out of the rubber sucker (3). At one end of the brake block (4) is a thread hole (41) that corresponds with the screw bolt (31). On the inside of the top end of the brake block (4) is a tapered face (42). At an end of the tapered face (42) is a brake groove (43), as shown in FIG. 3.

The rubber sucker (3) has its extended part of screw bolt (31) running through the through hole (21) on the lower casing (2), selectively screwed into the thread hole (41) at one end of the brake block (4), tightening the rubber sucker (3) and the brake block (4) onto the lower casing (2). The lower casing (2) containing the rubber sucker (3) and the brake block (4) may have its brake block (4) inserted into the through hole (11) on the upper casing (1), the protruded block (12) and the brake block (4) therein in mesh with the tapered face (42) on the inside of top end. By turning the upper casing (1) and the lower casing (2), the protruded block (12) and the tapered face (42) of the brake block (4) creates a dislocation, arrested by the brake groove (43), pulling up the rubber sucker (3) to close the upper and lower casings (1), (2) and enhance the sucking strength of the rubber sucker (3).

Figure 4:
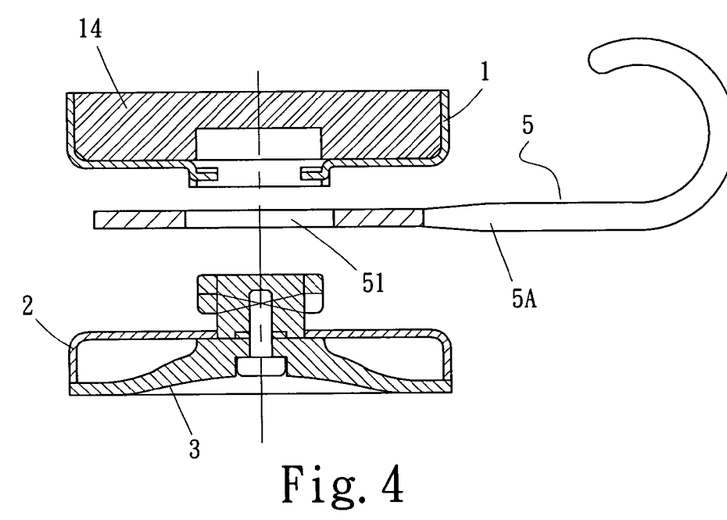
FIG. 4 is a section view of disassembled main components of the invention.
Figure 5:
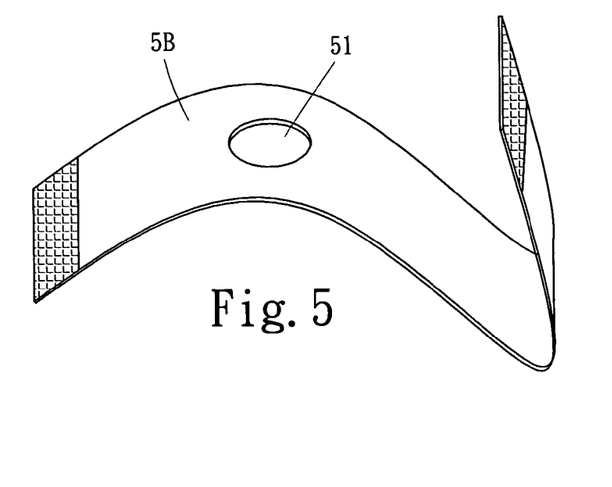
FIG. 5 is a perspective view of the Velcro band accessory of the invention.

As shown in FIG. 4, the invention also includes an accessory (5) that is selectively combined with the main unit, as shown in FIGS. 5 to 8, the accessory (5) includes a hanging hook (5A), a Velcro band (5B), a wire bundling band (5C), a signboard (5D) and a multiple-function gripping palm figure (5E) or pipe fixing ring or such connecting device, on the accessory (5) described in the above embodiments is provided a bore (51). The bore (51) may be positioned between the upper and lower casings (1)(2) when the upper and lower casings (1)(2) are separated, thereby, the invention of multiple-function hanging and fastening device can be widely used in all sorts of hanging, sucking, attracting and fastening applications.

Figure 6:
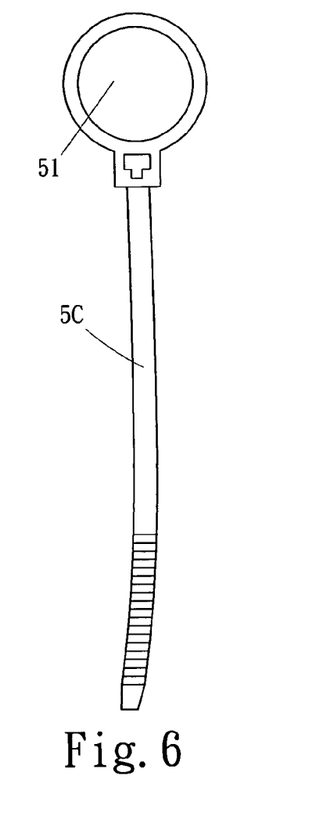
FIG. 6 is a plan view of the signboard accessory of the invention.
Figure 7:
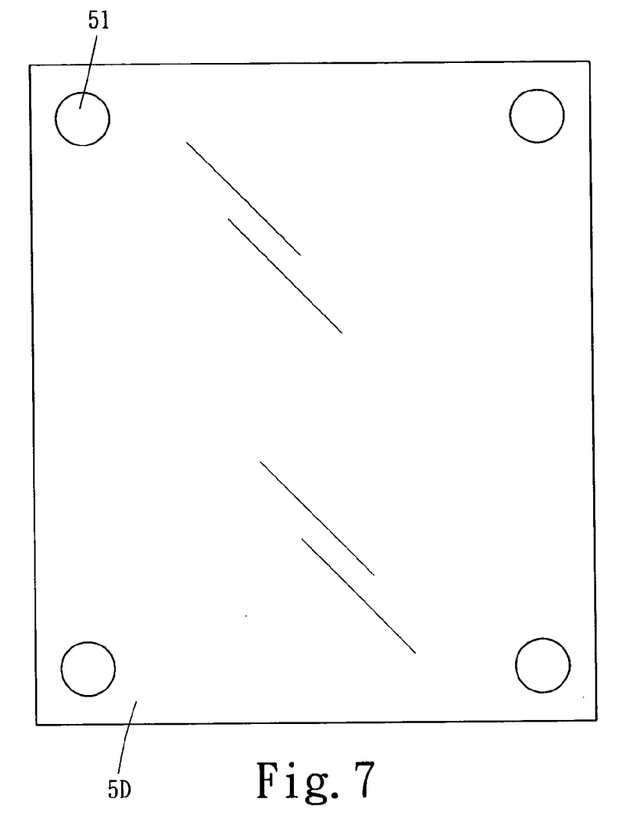
FIG. 7 is a plan view of the wire bundling band of the invention.
Figure 8:
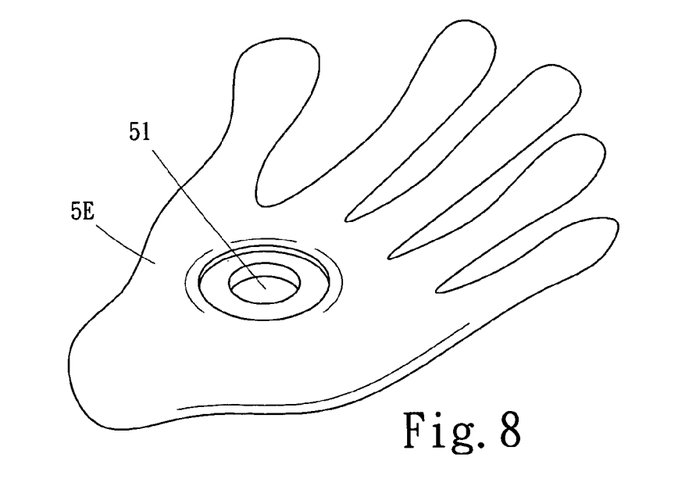
FIG. 8 is a perspective view of the palm figure accessory of the invention.

As shown in FIGS. 6 and 7, as described above, the invention enables the user to choose a front side or a reverse side of the magnet (14) or rubber sucker (3) to attach the multiple-function hanging and fastening device onto a smooth surface, such as a glass panel (6), or a metal panel (7) of a white board, computer housing or a refrigerator.

Figure 9:
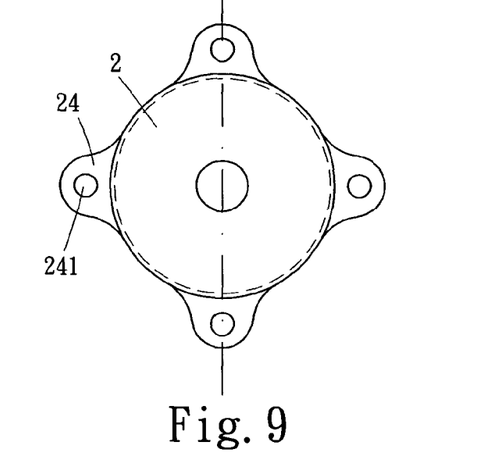
FIG. 9 is a bottom view of the lower casing with a tightening block of the invention.
Figure 10:
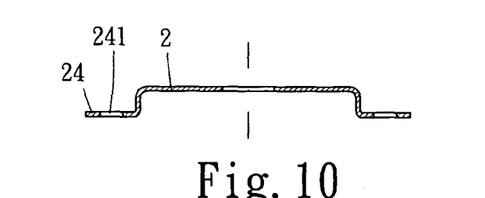
FIG. 10 is a section view of the lower casing with a tightening block of the invention.
Figure 11:
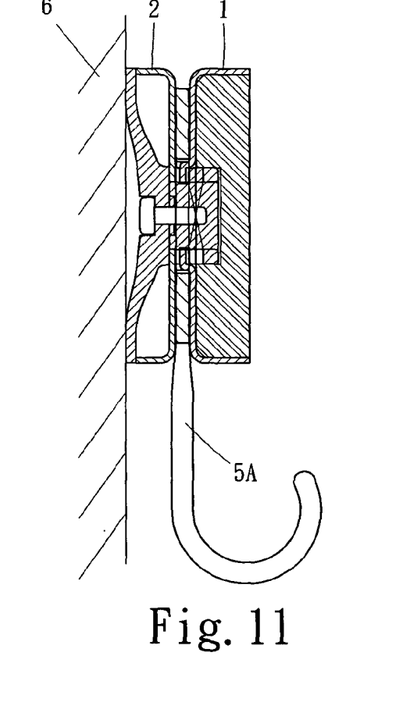
FIG. 11 is a schematic view of the embodiment wherein the device of the invention is sucking onto a glass panel.
Figure 12:
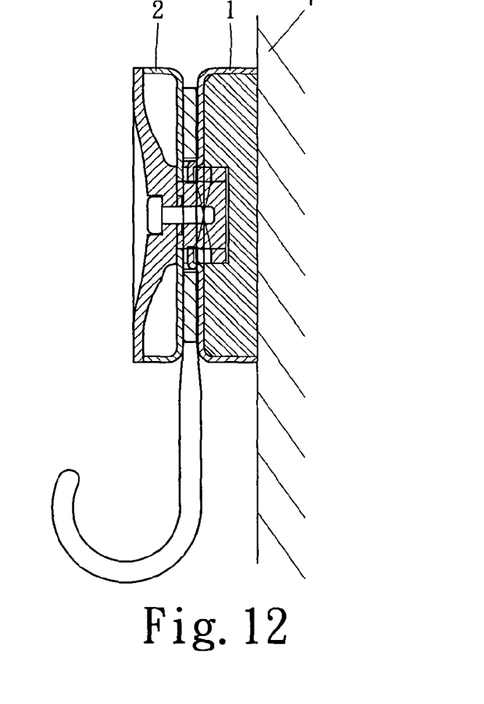
FIG. 12 is a schematic view of the embodiment wherein the device of the invention is sucking onto a metal panel.

As shown in FIG. 9, on the exterior of the lower casing (2) is selectively provided with two to four pieces of tightening block (24). On each tightening block (24) is a tightening screw hole to be inserted by a screw bolt, thereby fastening the multiple-function hanging and fastening device onto a regular wall, particularly for applications where it is necessary to hang heavier objects or fasten pipes.

DESCRIPTION OF THE PREFERRED EMBODIMENT

Figures 13, 14, 15, 16, 17:
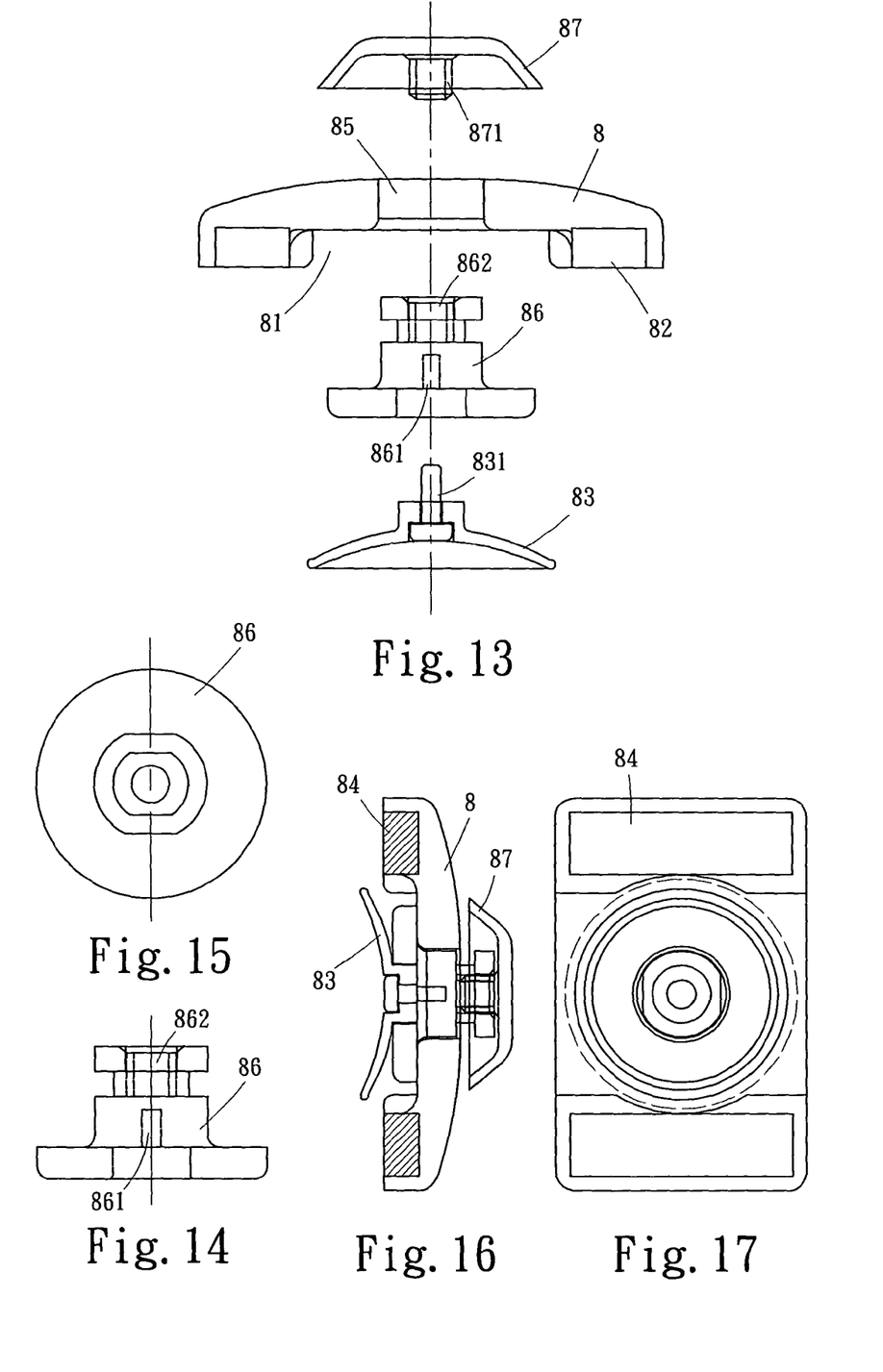
FIG. 13 is a section view of disassembled components in another embodiment of the invention.
FIG. 14 is a side view of the moving block in another embodiment of the invention.
FIG. 15 is a bottom view of the moving block in another embodiment of the invention.
FIG. 16 is a section view of assembled components in another embodiment of the invention.
FIG. 17 is a side view of FIG. 16.
Figures 18, 19:
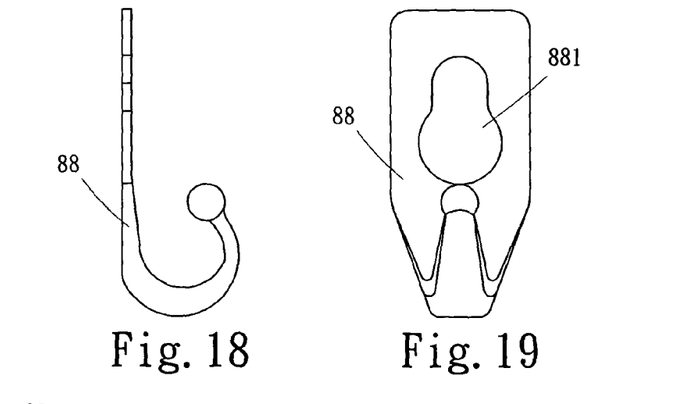
FIG. 18 is a side view of the hanging hook accessory of the invention.
FIG. 19 is a front view of the hanging hook accessory of the invention.
Figures 20, 21:
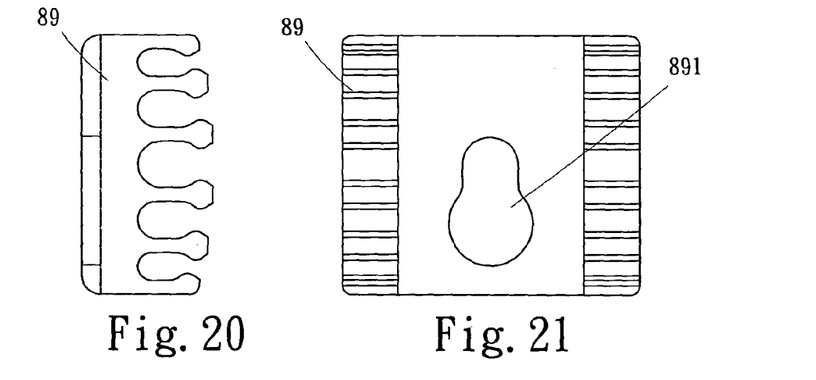
FIG. 20 is a side view of the wire clip accessory of the invention.
FIG. 21 is a front view of the wire clip accessory of the invention.

In the foregoing structure, the present invention can also be embodied in a design to include a magnet and a rubber sucker simultaneously on a single side of a casing, please refer to FIG. 13, at a center of one side of a casing (8) is reserved a depressed groove (81) to accommodate a rubber sucker (83), on two sides are also reserved a depressed groove (82) to accommodate a magnet (84), to enable suction function simultaneously by the rubber sucker (83) and the magnet (84), at a center of the casing (8) is a through hole (85) to be inserted by one end of a moving block (86), as shown in FIGS. 14 and 15.

An extended rod (831) is planted on the rubber sucker (83), or is selectively fixed to a center hole (861) of the moving block (86) to combine with the moving block (86) as one unit, on one end of the moving block (86) is a thread hole (862), enabling the screw bolt (871) of the nut (87) outside the casing (8) to be screwed into the thread hole (862), so it will properly pull up the rubber sucker (83), and have better suction efficiency, as shown in FIGS. 16 and 17.

Figure 22:
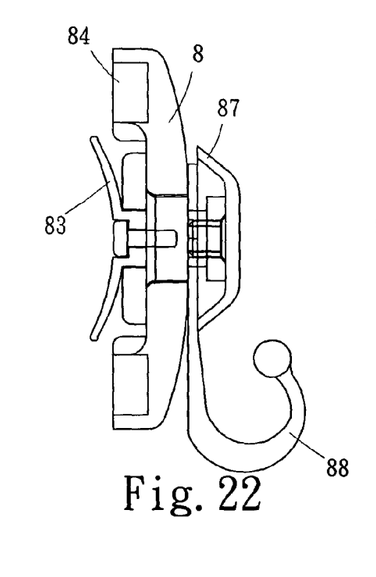
FIG. 22 is a section view of assembled components of another embodiment of the invention having a hanging hook.
Figure 23:
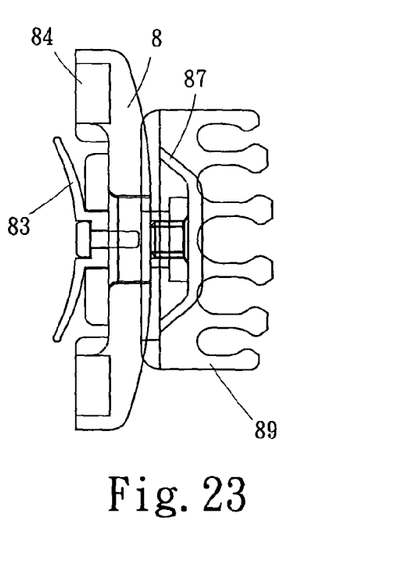
FIG. 23 is a section view of assembled components of another embodiment of the invention having a wire clip.

In the embodiment, in the space between the casing (8) and the nut (87) can be inserted a hanging hook (88) and wire clip (89) as shown in FIGS. 18, 19 and 20, 21, on the hanging hook (88) and the wire clip (89) is a through hole (881), (891), penetrated and tightened by the screw bolt (871) of the nut (87), as embodied in FIGS. 22 and 23.

Figure 25:
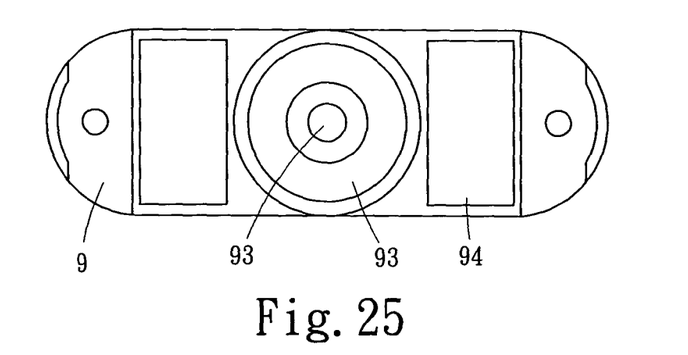
FIG. 25 is a top view of FIG. 24.
Figure 26:
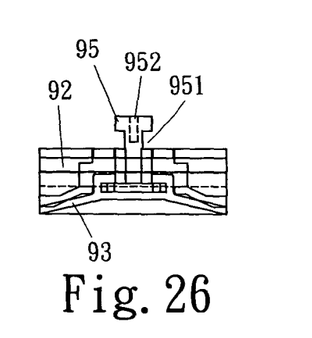
FIG. 26 is a side view of FIG. 24.

On the same side of the casing is also the construction of a magnet and a rubber sucker. The present invention has another embodiment; please refer to FIGS. 24, 25 and 26, besides a rubber sucker (93) and a magnet (94), the arch casing (9) has on one side a turning rod (92), there is a center hole (91) on the arch casing (9) matching the rubber sucker (93). A hanging hook (95) is selectively fixed on the rubber sucker (93).

Figure 27:
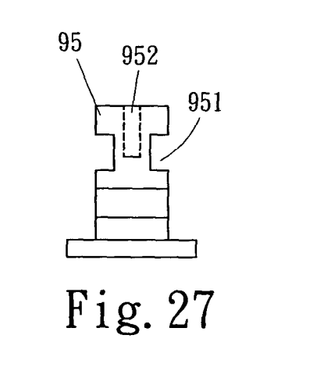
FIG. 27 is a side view of the hanging hook of the invention.
Figure 28:
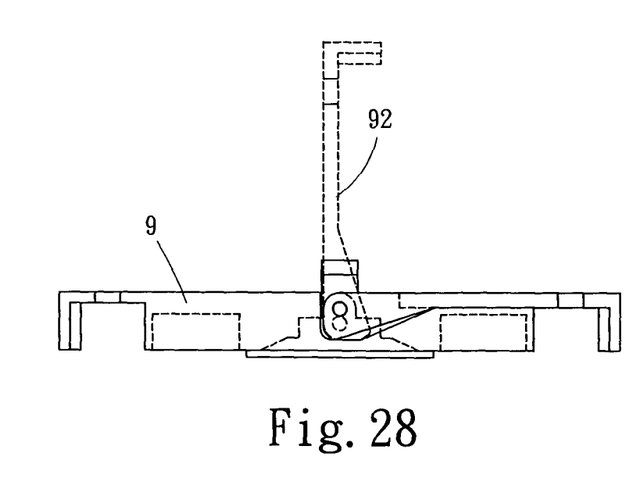
FIG. 28 is a schematic view of another embodiment of the invention in operation.

As shown in FIG. 27, there is a shaft hole (951) on the hanging hook (95), combined with a shaft rod (921) on the turning rod (92). When the turning rod (92) turns in a horizontal direction to combine with the arch casing (9), a protruded block (922) at one end of the turning rod (92) will pull up the rubber sucker (93) to have better sucking effects, as shown in FIG. 28.

Figure 24:
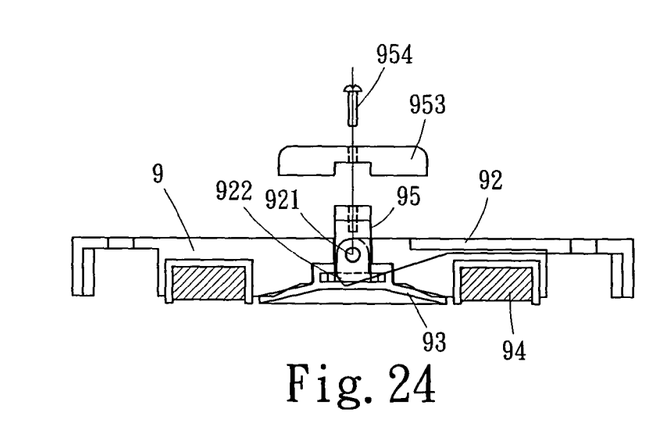
FIG. 24 is affront view of another embodiment of the invention.

As shown in FIG. 24, there is a thread hole (952) on the hanging hook (95), whereon a screw bolt (954) is inserted in a carrier unit (953) to fasten the foregoing accessories (5).

Figure 29:
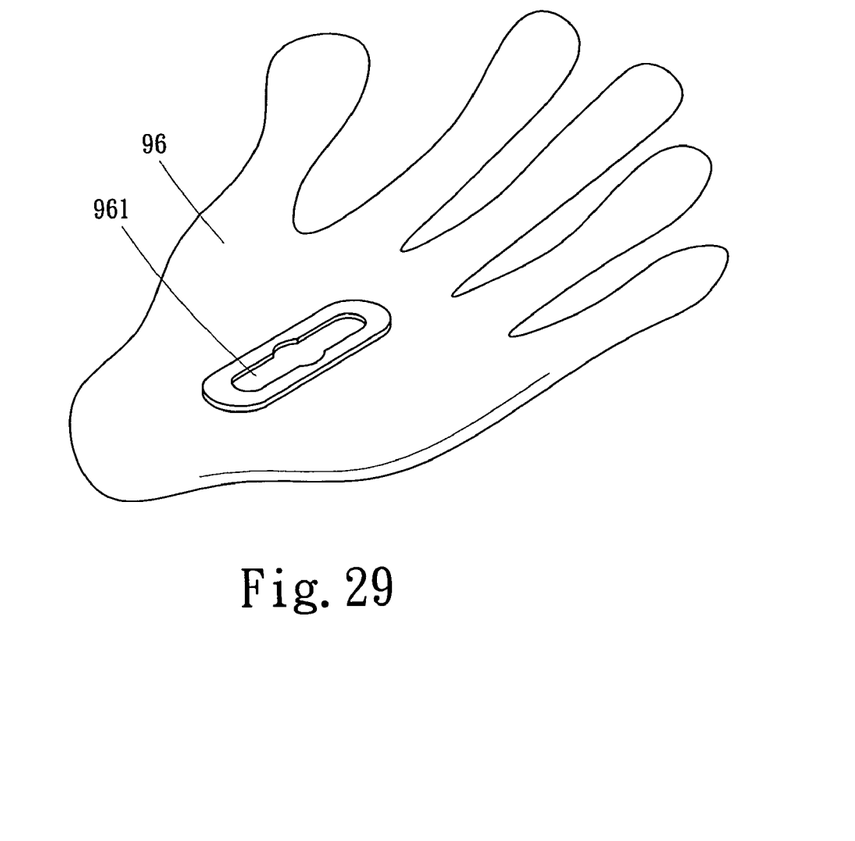
FIG. 29 is a perspective view of the palm figure accessory of the invention.
Figure 30:
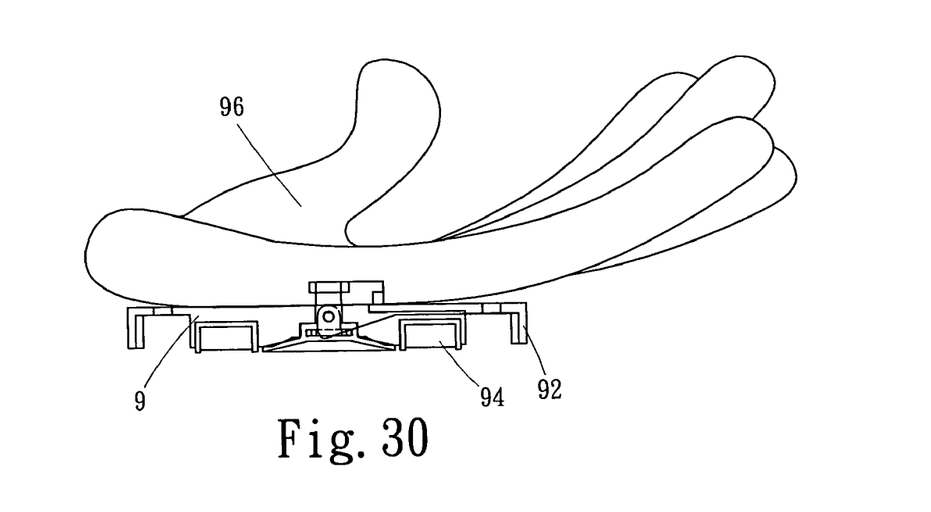
FIG. 30 is a schematic view of another embodiment of the invention having a palm figure accessory.

As shown in FIGS. 29 and 30, there is selectively any configuration of accessory in a fastening hole (961) on the hanging hook (95), such as a gripping palm figure accessory (96), buried in the palm figure is a metal wire (not shown in diagram), so its finger can be freely bent into a hook or grip shape, providing a hanging function for key rings, wires, computer peripherals, car appliances, kitchen ware, bathroom utensils, hand-held cell phones, tea cups, mirror, public notices, signboards, etc. Summing up, the present invention is a practical and universal-purpose suction and attaching device.

I claim:

1. A multiple-function hanging and fastening device, comprising:
    a set of upper casing and lower casing that are selectively separated and assembled;
    the upper casing being shaped like a disc, having an upper casing through hole at a center thereof, an inside of the upper casing through hole having a protruded block protruding toward the center, the upper casing having an upper casing depressed groove and accommodating a magnet;

the lower casing being shaped like a disc, but facing a direction opposite to the upper casing, and having a lower casing through hole at a center thereof, the lower casing having a lower casing depressed groove and accommodating a rubber sucker set, the rubber sucker set comprising:

a rubber sucker having a screw bolt at a center thereof, one end of the rubber sucker extending out of the rubber sucker;

a brake block including one end having a threaded hole engaging the screw bolt, an inside of a top end of the brake block having a tapered face, the tapered face having a brake groove at an end thereof, the rubber sucker having the screw bolt extended through the lower casing through hole, and selectively screwed into the threaded hole at one end of the brake block, tightening the rubber sucker and the brake block onto the lower casing; whereby either side of the multiple-function hanging and fastening device is selectively attached onto a smooth surface of a glass panel or a metal panel, using the magnet or the rubber sucker.

2. The multiple-function hanging and fastening device according to claim 1, wherein the upper casing and the lower casing are rotatably connected by the brake block, the tapered face of the brake block is located adjacent to the protruded block of the upper casing, such that, when the upper casing and lower casing are rotated the protruded block engages the tapered face and moves the protruded block and the rubber sucker between first and second positions.

3. The multiple-function hanging and fastening device according to claim 1, wherein an accessory is inserted between the upper and lower casings, the accessory selected from the group consisting of a hanging hook, a hook and loop band, a wire bundling band, a signboard and a multiple-gripping palm figure, and the accessory has a bore.

4. The multiple-function hanging and fastening device according to claim 1, wherein on an outside of the lower casing has a plurality of extended tightening blocks, each tightening block having a tightening hole inserted by a screw bolt to tighten the multiple-function hanging and fastening device on a wall surface.

5. A multiple-function hanging and fastening device comprising: a casing, a moving block, a nut, a rubber sucker, and a magnet, at a center of a first side of the casing is a first depressed groove accommodating the rubber sucker and a second depressed groove accommodating the magnet, the rubber sucker being connected to the moving block that is inserted through a through hole in the casing, the nut is located on a second side of the casing and connected to the moving block, wherein the nut moves the rubber sucker between first and second positions.

6. The multiple-function hanging and fastening device according to claim 5, wherein the rubber sucker has an extended rod fixed in a center hole located on a first end of the moving block, a threaded hole is located on a second end of the moving block, and a screw bolt of the nut is inserted into the threaded hole.

7. The multiple-function hanging and fastening device according to claim 5, wherein an accessory selected from a group consisting of a hanging hook and a wire clip is inserted between the casing and the nut, and the accessory has a through hole penetrated by the screw bolt of the nut.

8. A multiple-function hanging and fastening device comprising: a casing containing a magnet and a rubber sucker, the rubber sucker inserted into a center hole of the casing; a turning rod connected to the rubber sucker and moving the rubber sucker between first and second positions; and an accessory fixed on the rubber sucker.

9. The multiple-function hanging and fastening device according to claim 8, further comprising a hanging hook, wherein the hanging hook has a shaft hole, the turning rod has a shaft rod inserted into the shaft hole, such that, when the turning rod turns in a horizontal direction, a protruded block on an end of the turning rod pulls the rubber sucker toward the casing.

10. The multiple-function hanging and fastening device according to claim 8, further comprising a carrier unit connected to the rubber sucker.

11. The multiple-function hanging and fastening device according to claim 8, wherein the accessory is a palm figure accessory having bendable finger shaped hooks.

* * * * *